United States Patent
Spampinato et al.

(10) Patent No.: US 11,146,205 B2
(45) Date of Patent: Oct. 12, 2021

(54) METHOD FOR CONTROLLING ELECTRIC MOTORS, CORRESPONDING CIRCUIT AND COMPUTER PROGRAM PRODUCT

(71) Applicant: STMicroelectronics S.r.l., Agrate Brianza (IT)

(72) Inventors: Andrea Spampinato, Mascalucia (IT); Gianluigi Forte, Camporotondo Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/750,216

(22) Filed: Jan. 23, 2020

(65) Prior Publication Data
US 2020/0252021 A1 Aug. 6, 2020

(30) Foreign Application Priority Data
Feb. 1, 2019 (IT) .................. 102019000001507

(51) Int. Cl.
*H02K 17/32* (2006.01)
*H02K 23/68* (2006.01)
*H02K 27/30* (2006.01)
*H02P 7/00* (2016.01)
*H02P 29/032* (2016.01)

(52) U.S. Cl.
CPC .................. *H02P 29/032* (2016.02)

(58) Field of Classification Search
CPC ..................................... H02P 29/032
USPC ......................................... 318/434
See application file for complete search history.

(56) References Cited

U.S. PATENT DOCUMENTS

| 7,026,776 | B1* | 4/2006 | Walters | H02P 6/182 318/430 |
| 8,866,428 | B2 | 10/2014 | Hao et al. | |
| 9,496,817 | B1* | 11/2016 | Lepka | H02P 29/67 |
| 2006/0250154 | A1* | 11/2006 | Gao | G01R 31/343 324/765.01 |
| 2010/0320946 | A1* | 12/2010 | Ueda | H02P 6/20 318/400.3 |
| 2016/0133410 | A1* | 5/2016 | Bock | H01H 47/325 361/160 |

(Continued)

FOREIGN PATENT DOCUMENTS

EP 3076543 A1 10/2016

OTHER PUBLICATIONS

Determining Electric Motor Load and Efficiency—Motor Challenge; published by the U.S. Department of Energy (document 10097517), Jan. 2017, 16 pages.

(Continued)

*Primary Examiner* — Erick D Glass
(74) *Attorney, Agent, or Firm* — Crowe & Dunlevy

(57) ABSTRACT

A multi-phase electric motor includes a stator winding. The multi-phase electric motor is controlled by regulating a current flowing in the multi-phase electric motor in response to an applied voltage. An overload condition of the multi-phase electric motor is detected by monitoring a thermal increase of the value of a stator resistance of the stator winding of the multi-phase electric motor during a steady state condition of said multi-phase electric motor in which the current flowing in the motor has constant phase, and the motor is operating at constant load with constant speed.

17 Claims, 5 Drawing Sheets

(56) References Cited

U.S. PATENT DOCUMENTS

2018/0248499 A1* 8/2018 Kaidu ................... H02P 21/14
2021/0165353 A1* 6/2021 Itoh ....................... H02P 21/18

OTHER PUBLICATIONS

IT Search Report and Written Opinion for IT Appl. No. 102019000001507 dated Sep. 17, 2019 (8 pages).

* cited by examiner

METHOD FOR CONTROLLING ELECTRIC MOTORS, CORRESPONDING CIRCUIT AND COMPUTER PROGRAM PRODUCT

PRIORITY CLAIM

This application claims the priority benefit of Italian Application for Patent No. 102019000001507, filed on Feb. 1, 2019, the content of which is hereby incorporated by reference in its entirety to the maximum extent allowable by law.

TECHNICAL FIELD

Embodiments of the present disclosure relate to solutions concerning techniques for controlling a multi-phase electric motor performing a detection of an overload, including controlling the current in the multi-phase electric motor by controlling an applied voltage.

The present disclosure in particular refers to techniques for detection of an overload during operation of the multi-phase electric motor and for detection of a maximum current.

BACKGROUND

A variety of products may involve multi-phase, in particular three phase, motor control applications, e.g., for position control and/or speed control applications.

Home appliances such as washing machines, dryers, refrigerators, industrial and home automation, the automotive sector and medical devices may be exemplary of such products.

The electrical motors usually permit overloaded operation as long as they remain in a defined range, in terms of current limits and duration. Usually, the higher the overload current, the lower the duration of the permitted overload operation.

The operating range of the electric motors tends to decrease as the motor ages, thus it can be very helpful to detect such operating range in order to avoid damaging the motor during normal operation, which is always an undesired condition in any application field.

FIG. 1 shows an electric motor system 10 comprising a multi-phase, specifically three phase, induction electric motor 11 which is controlled by a three phase inverter 12. A supply voltage $V_{mains}$ which is an AC voltage at a frequency of 50/60 Hz is taken from the electric mains 13 and fed to a rectifier 14. The rectifier 14 converts the AC signal into a DC signal. A DC voltage $V_{dc}$ is formed on a filter capacitor 15, coupled in parallel on the output terminals of the rectifier 14. This DC voltage is fed to the three phase inverter 12, which in turn generates the phase voltages $v_a$, $v_b$, $v_c$ for controlling the three phase electric motor 11.

Considering the PWM (Pulse Width Modulation) as switching logic of the inverter 12, the output voltages, i.e., phase voltages $v_a$, $v_b$, $v_c$, of the inverters have an AC waveform and contain several harmonics. Both the fundamental harmonic and the high frequency harmonic used for performing the PWM modulation are present. The output filter in this case is represented by the electric motor 11 itself and then the phase voltages seen by the electric motor 11 are given by the following equations:

$$v_a = m_a \frac{v_{DC}}{2} \sin(\omega t); \qquad (1)$$

$$v_b = m_a \frac{v_{DC}}{2} \sin\left(\omega t - \frac{2}{3}\pi\right);$$

$$v_c = m_a \frac{v_{DC}}{2} \sin\left(\omega t + \frac{2}{3}\pi\right)$$

where $m_a$ indicates the Amplitude Modulation Coefficient ($0 \leq m_a \leq 1$), and determines the maximum value for the duty cycle D.

The output power is regulated changing the amplitude modulation coefficient $m_a$.

Usually the amplitude modulation coefficient $m_a$ value is decided by a motor phase current controller that chooses the correct modulation coefficient $m_a$ according to the target working point, i.e., rotor speed and load torque, of the electric motor 11.

For the same target working point the amplitude of the current and also the modulation coefficient $m_a$ remains constant.

The overload condition causes a not negligible variation in parameters, mainly due to temperature increase and, as known, the over temperature decreases the life and the efficiency of the motor, considering also that such variation in parameters can negatively impact any algorithm that performs an estimation process using the mathematical model of the motor.

Usually additional hardware and measurement instruments are required to monitor the temperature for over temperature management.

In the operating field, however, it is not always possible to use measurement instruments (i.e., power meter, ammeter) during the normal operation and a dedicated maintenance/measurement session is required, thus stopping the process.

Computerized load and efficiency estimation techniques are known from the document "DETERMINING ELECTRIC MOTOR LOAD AND EFFICIENCY—Motor Challenge" published by the U.S. Department of Energy (document ID 10097517).

The known solutions usually refer to the induction motors directly power supplied by the mains network, thus the overload detection methods are based on the line current monitoring since in that case the voltage is fixed and the current increases with the power losses.

There is accordingly a need in the art to provide solutions which overcome one or more of the above drawbacks.

SUMMARY

According to one or more embodiments, one or more of the above objectives is achieved by means of an overload detection method having the features specifically set forth in the claims that follow. Embodiments moreover concern a related method and computer program product.

In an embodiment, a method of controlling a multi-phase electric motor comprises: detecting an overload condition of said multi-phase electric motor; regulating a current flowing in the multi-phase electric motor by controlling a multi-phase voltage applied to the motor through a switch mode inverter driven by a control modulated signal, in particular a pulse width modulated signal; and monitoring a thermal increase of the value of a stator resistance of the multi-phase electric motor during a steady state condition of said multi-phase electric motor in which the current flowing in said electric motor has constant phase, in particular at constant load, and at constant speed of said electric motor.

In variant embodiments, monitoring the thermal increase of the value of the stator resistance includes monitoring a modulation index of the voltage applied to the multi-phase electric motor.

In variant embodiments, monitoring the thermal increase of the value of the stator resistance includes monitoring a duty cycle of the voltage applied to the multi-phase electric motor.

In variant embodiments, monitoring the thermal increase of the value of the stator resistance includes estimating the resistance with a self-commissioning algorithm.

In variant embodiments, monitoring the thermal increase of the value of the stator resistance includes computing/estimating the motor power using the phase voltages and currents.

In variant embodiments, monitoring the modulation index comprises: detecting during operation of the motor a steady state condition of the electric motor; monitoring the modulation index; verifying if a monotonic increase of the modulation index occurs while the motor is in steady state condition to enter an overload detection state.

In variant embodiments, said method includes detecting a steady state condition of the motor as a function of the speed and torque of the motor.

In variant embodiments, said method includes, after said step of verifying, measuring the stator resistance value.

In variant embodiments, said method includes: a) regulating the DC current in the motor while in a standstill condition; b) detecting a steady state condition of the motor; c) monitoring a duty cycle of a voltage applied to the high side of a first leg of a switch mode inverter, while maintaining open the switches of the other legs with the exception of one of the low side switches of said other legs, which is maintained closed; d) verifying if a monotonic increase of the duty cycle occurs while the motor is in steady state condition to enter an overload state; e) if the motor is not in a steady condition repeat steps a)-d) and increasing the current by a fixed amount; and f) acquiring as a maximum current the last value of current before the verification of the condition in step d).

In an embodiment, a driving circuit for a multi-phase electric motor having a stator winding comprises: a module configured to detect an overload condition of said multi-phase electric motor; and at least a module configured to regulate a current flowing in the multi-phase electric motor by controlling an applied voltage. The module configured to detect is configured to monitor a thermal increase of the value of a stator resistance of the stator winding of the multi-phase electric motor during a steady state condition of said multi-phase electric motor in which the current flowing in said electric motor has constant phase, in particular at constant load, and the motor has a constant speed.

In variant embodiments said device includes: a steady state detection module configured to detect during operation of the motor a steady state condition of the electric motor as a function of the torque and speed of said motor; a monitoring module configured to monitor the modulation index and to verify if a monotonic increase of the modulation index occurs while the motor is indicated in steady state condition by steady state detection module to enter an overload detection state, and in particular to also measure a stator resistance value.

In variant embodiments said device further includes: a module configured to a) regulate the DC current in the motor while in a standstill condition; and a steady state detection module configured to b) detect during operation of the motor a steady state condition of the electric motor as a function of the torque and speed of said motor; wherein said device is configured to c) monitor a duty cycle of a voltage applied to the high side of a first leg of a switch mode inverter, while maintaining open the switches of the other legs with the exception of one of the low side switches of said other legs, which is maintained closed; d) verify if a monotonic increase of the duty cycle occurs while the motor is in steady state condition to enter an overload state; e) if the motor is not in a steady condition then repeat steps a)-d) while increasing the current by a fixed amount; d) if the motor is in a steady condition acquire as a maximum current the last value of current before the verification of the condition in d).

In variant embodiments, said device includes: a multi-phase electric motor coupled with a drive device according to any of the previous embodiments.

The present disclosure relates also to a computer program product directly loadable into the internal memory of a digital computer, comprising software code portions for performing the steps of the method of any of the previous embodiments.

BRIEF DESCRIPTION OF THE DRAWINGS

Embodiments of the present disclosure will now be described with reference to the annexed drawings, which are provided purely by way of non-limiting example and in which.

DETAILED DESCRIPTION

Figure 1:
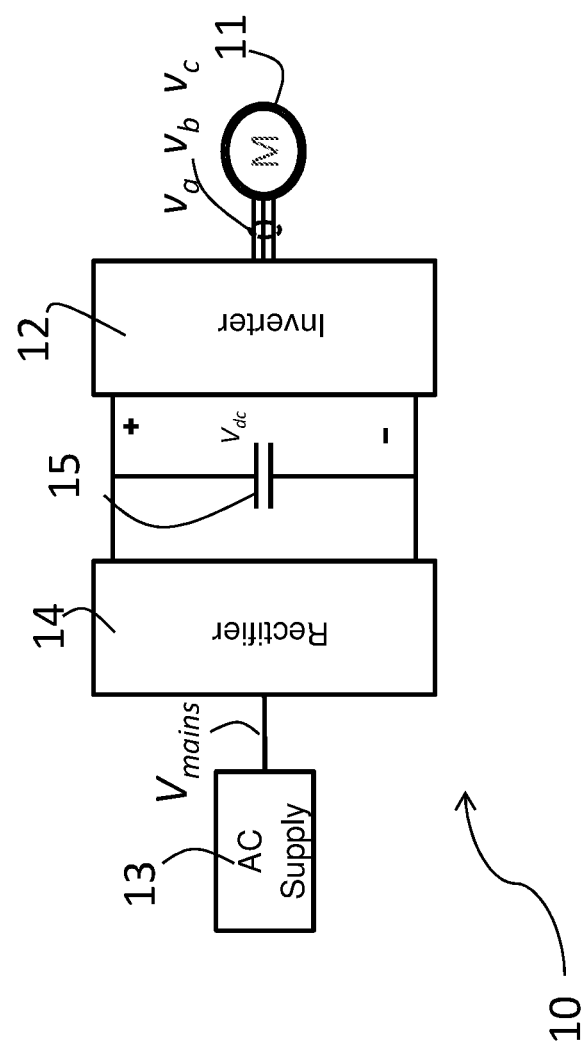
FIG. 1 shows an electric motor system.

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The solution here described basically performs detection of a current overload condition in a multi-phase electric motor, by monitoring a thermal increase of the value of a stator resistance of the electric motor, due to the Joule effect, in particular during the steady state condition, in particular at constant current phase, in particular constant load or constant RMS current value, and at constant speed of the electric motor.

The current flowing through a conductor always generates heat which is exchanged with the environment until there is a difference between the conductor temperature and the environment temperature.

The stator winding of an electric motor, which presents a resistance that is arranged in series with respect to the current input to the motor, is designed to support a maximum current that can be higher than the rated or nominal current, at which the electric motor normally operates. This maximum current, indicated often as Imax in the motor data sheet, is obtained by designing the stator winding as oversized.

When the current flowing through the stator winding is higher than such maximum current, the stator winding is not able to exchange all the produced heat with the environment. As a result, the winding warms up and the resistance of the conductor (e.g., copper) increases according to the following law:

$$R_t = R_{20}(1 + \alpha_{20}(t-20)) \qquad (2)$$

where t indicates the actual temperature of the conductor, $R_t$ indicates the resistance at temperature t, $R_{20}$ is the resistance at a reference temperature of 20° C. and $\alpha_{20}$ is the temperature coefficient resistance for the conductor material at 20° C.

More specifically, during operation in a steady state condition of the electric motor, where a motor control circuit controls the voltage applied to the electric motor in order to maintain a given target current, usually two situations may happen: a) the target current is not higher than the nominal current and then the temperature of the stator winding does not increase since all produced heat is exchanged with the environment; or b) the target current is higher than the nominal current and then the temperature of the stator winding increases since not all the produced heat is exchanged with the environment. This causes an increase of resistance of the stator winding and thus the input power increases. The amplitude of the DC current in the motor is maintained constant by the control circuit of the motor, as a consequence the voltage applied to the motor is increased to cover the losses.

The monitoring of the estimated stator winding resistance value trend at a determined working point, specifically constant amplitude of phase current and constant speed of the electric motor, is thus performed in order to detect a not negligible increase, e.g., by a defined percentage, of this resistance originated by a current higher than the nominal current.

The estimation or detection of the stator winding resistance can be performed by preferably monitoring the value of a modulation coefficient of the voltage applied to the electric motor, as better detailed in the following, and then monitoring the reference phase voltage amplitude.

In variant embodiments other procedures for the estimation or detection of the stator winding resistance are possible.

In variant embodiments, the estimation or detection of the stator winding resistance can be performed offline by monitoring a duty cycle of the voltage applied to the electric motor.

In variant embodiments, the estimation or detection of the stator winding resistance can be performed by using a so called self-commissioning algorithm.

In variant embodiments, the estimation or detection of the stator winding resistance can include estimating the motor power using the values of phase voltages and currents.

In addition, the solution here described in variant embodiments may be used to detect the maximum current, i.e., the maximum current, Imax, which can flow continuously in the stator windings without damaging the electric motor.

As the aging of the electric motor causes a modification of the electromechanical characteristics of the electric motor, such as an increase of the stator winding resistance that still allows the motor to work but with lower efficiency, the knowledge of the actual maximum phase current can be an important aging indicator.

Because of such aging, providing the same current level according to the original design can result in serious damage to the motor due to the increased winding resistance. When the motor application permits limiting the current using the new estimated value, the life of the motor can be extended. Otherwise, a preventive fault has to be reported in order to plan for replacement of the motor.

Operations may be performed to monitor the value of the modulation coefficient $m_a$ in order to detect the overload condition.

The phase voltage $v_{phase}$, i.e., the phase voltages, $v_a$, $v_b$, $v_c$, on one of the phases a, b, c (in FIG. 2 indicated with the corresponding phase input nodes of the motor 11) of the electric motor at steady state is expressed by the following equation:

$$v_{phase} = R_s * i_{phase} + \frac{d}{dt}(\varphi_{phase}) \qquad (3)$$

where $R_s$ is the stator resistance, $i_{phase}$ is the corresponding phase current and $\varphi_{phase}$ is the phase electromagnetic flux. At steady state, the second term of the equation (3) is constant. As a result, the ratio of equation (4) below changes with the stator resistance $R_s$ only and this can be used to detect the trend of the stator resistance, $R_s$, useful for overload detection.

$$\frac{v_{phase}}{i_{phase}} = f(R_s); \frac{d}{dt}(\varphi_{phase}) = K = \text{constant} \qquad (4)$$

Since such constant second term K is known, at steady state, the proposed solution can also provide the estimation of the stator winding resistance in addition to its trend detection:

$$R_s = \frac{1}{i_{phase}} * (v_{phase} - K) \qquad (5)$$

Figure 2:
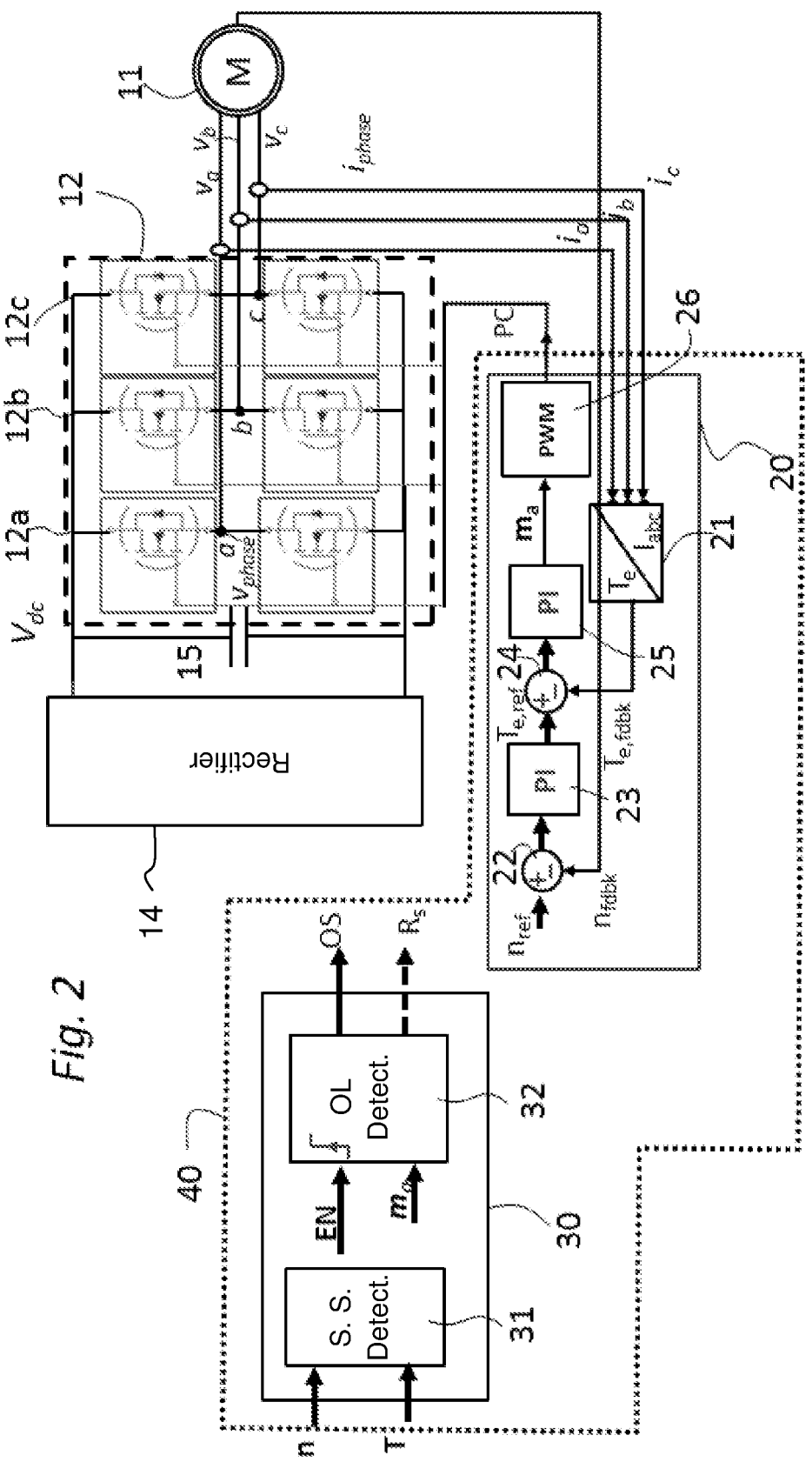
FIG. 2 is a schematic diagram of an embodiment of a circuit implementing the solution here described.

FIG. 2 shows the electric motor system 10 in more detail which comprises the three-phase induction electric motor 11, which may be a Permanent Magnet Synchronous Motor (PMSM), or in variant embodiments may be a different motor type such as Switched Reluctance Motor (SRM), Stepper Motor, DC Motor, Synchronous Reluctance Motor (SynRM), and a block 40 exemplary of, e.g., a motor driving module configured to drive the motor 11.

Various motor control procedures are known in the art which may be applied for that purpose: a so-called field oriented control (FOC), a sinusoidal control as well as a step commutation control may be exemplary of such control procedures.

The motor 11 is a three-phase electric motor, shown in FIG. 2 with the corresponding phase input nodes a, b, c, of the motor 11, and the switch inverter 12, which has a bridge structure, known per se, with high side and low side switches has consequently three bridge legs 12a, 12b, 12c, comprising a respective high-side switch, e.g., coupled to the voltage supply terminal, and a low side switch, e.g., coupled to the ground terminal. The rectifier 14 draws power from the mains 13, not shown here (see, FIG. 1), supplying the DC voltage $V_{dc}$ over the filter capacitor 15, across each leg 12a, 12b, 12c. On the nodes a, b, c, placed respectively each between the high side switch and low side switch of same leg, are taken the respective phase voltages $v_a$, $v_b$, $v_c$ which are applied to the three-phase motor 11.

The inverter 12 is controlled by the driving module 40 according to one of the control methods noted above in order to force the required current to the motor 11 according to the mechanical load condition, i.e., load torque T and rotor speed n, which can be directly measured or obtained by the voltages and currents of the motor, e.g., the back electromotive force is proportional to speed n and the torque T is proportional to the amount of current flowing through the motor 11.

A motor control logic circuit 20 is thus provided in the driving module 40 which includes a PWM modulator 26 to issue PWM command signals PC to the control electrodes of the switches of the inverter 12, in particular to the gates of MOSFET implementing such switches. In variant embodiments, the switches can be implemented by a different transistor technique, e.g., they can be IGBT or bipolar transistors. As shown, the motor control logic circuit 20, in a way known per se, implements two control loops. A first loop takes the speed of the motor 11, either measured or calculated from the back EMF of the motor 11, as feedback speed $n_{fdbk}$, which is compared in a difference block 22 to a reference speed $n_{ref}$ which is the controlling quantity. The resulting speed error, i.e., the difference $n_{ref}-n_{fdbk}$, is taken as input to a first proportional integral (PI) module 23 which outputs a reference torque $T_{e,ref}$.

A second loop includes a torque calculation module 21, which receives phase current $i_a$, $i_b$, $i_c$, taken on the lines applying phase voltages $v_a$, $v_b$, $v_c$, and calculates a torque feedback value $T_{e,fdbk}$ of the torque of the electric motor 11. In such second loop the torque feedback value $T_{e,fdbk}$ is compared in a second difference block 24 to the reference torque $T_{e,ref}$ and the resulting error, i.e., difference $T_{e,ref}-T_{e,fdbk}$, is brought as input to a second proportional integral module 25, which outputs the modulation index $m_a$, which represents the input of the PWM modulator 26 and controls the duty cycle of the PWM signal PC.

As shown, it is also provided in the system 10, specifically in the driving module 40, which is preferably a microcontroller or microprocessor implemented MCU (MicroController Unit), an overload detection module 30, which includes a steady state detection (S. S. Detect.) sub-module 31, receiving as input the feedback speed n and torque T and evaluating if their values identify a steady state condition. In the affirmative, an enable signal EN output by the steady state detection module 21 takes a value, e.g., logic one, suitable to enable operation of a subsequent overload detection sub-module 32, which also receives the modulation index $m_a$ values. If, as better explained with reference to the flow diagram of FIG. 3, the overload detection (OL Detect.) submodule 32 is enabled and detects an increase of the modulation index $m_a$ values over time, for instance above a given threshold, in particular a percentage of variation such as 25%, a signal OS signaling an overload state is issued. The overload detection sub-module 32 also calculates and supplies the stator winding resistance value $R_s$ computed, for instance, by the equation (5).

Figure 3:
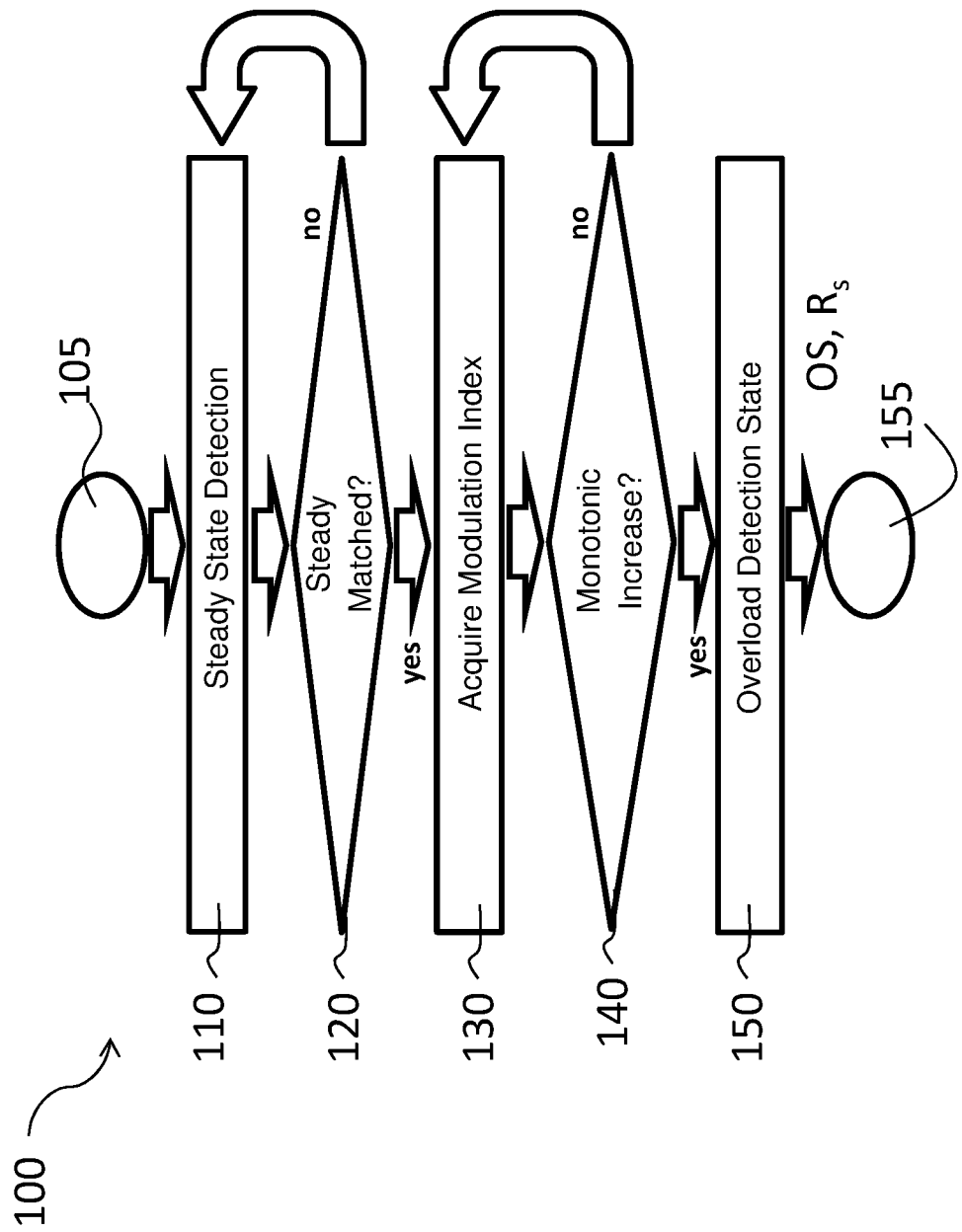
FIG. 3 is a flow diagram of operations of an embodiment of the solution here described.

FIG. 3 is a flow diagram illustrating an embodiment 100 of the method of controlling the motor with a detection of overload as herein described. This method may be implemented by the system of FIG. 2 as shown, by monitoring a modulation index.

After a start 105 of the operations, the method 100 provides in a step 110 performing a detection of a steady state condition of the motor, i.e., the detection of the load and the speed of the motor 11. As mentioned this can be performed using the sub-module 31 described with reference to FIG. 2, i.e., taking the speed n and torque T values provided to the control module 20 for the control of the motor 11.

Then, a test step 120 is performed, checking whether a steady condition is matched, e.g., the torque and speed values fall within a value range or correspond to values defining a steady state condition. Basically, monitoring the speed error may represent a good approach, taking in account that the error in the first loop will not perfectly equal to zero but it will oscillate in a small band centered on zero value. Also the monitoring of the torque may represent a valid approach, which can be used when only a torque control is implemented.

If NO, then the operations 110, 120 are repeated. If YES, an operation 130 of acquiring the modulation index $m_a$ is performed.

If in a following test 140 the modulation index $m_a$ is found to monotonically increase and the motor 11 is still operating in steady state as ascertained by the test 120 (otherwise also the test 140 is disenabled, e.g., for instance by the enable signal EN of FIG. 2 turning to the low logic state), then a following operation 150 of entering an overload detection state is performed, for instance issuing the overload state signal OS. The process then ends in step 155.

Figure 4:
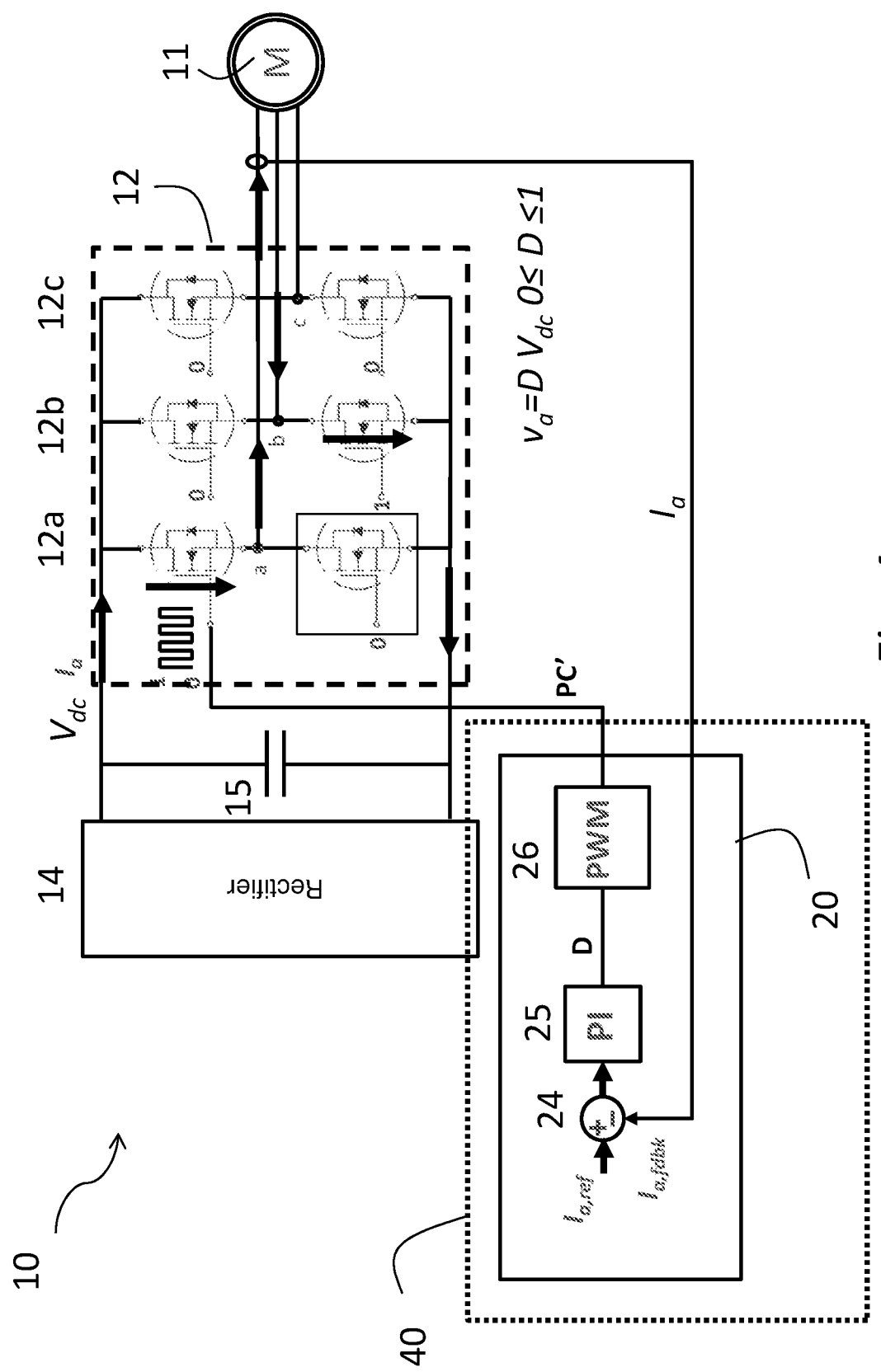
FIG. 4 is a schematic diagram of a variant embodiment of a circuit implementing the solution here described.

FIG. 4 shows the electric motor system 10 in a further configuration of use, which corresponds to an offline condition of operation of the motor 11. The electric motor system 10 is configured so that the PWM output signals, indicated with PC' in this case, of the motor control logic 20 in the driving module 40, i.e., the output of the PWM module 26, is connected only to the high side transistor of the first leg 12a and includes only the first control loop. The control electrodes, e.g., the gates of the corresponding MOSFETs, of the high side and the low side switches of the third leg 12c, the low side switch of the first leg 12a and the high side switch of the second leg 12b are kept at low level, i.e., the switches are open, for instance by commanding circuitry of the motor control logic 20 not shown in FIG. 4 to send such logic levels on the line already connected to the control electrodes of the switches, or by another control module. In the same way, the low side switch of the second leg 12b is kept closed, by sending a high logic level.

It is emphasized that in FIG. 4 there is the same logic 20, as in FIG. 2, however, the control logic can be embodied by a different control module and by different control loops in the driving module 40. In the same way, the driving module 40 can be embodied by a single microcontroller or processor or its function distributed of over a plurality of microcontrollers or processors.

The inverter 12 is thus controlled in order to force a motor current $I_a$ flowing through two phases, in the example a and b, to the motor 11 as shown by the thicker arrows. The logic is to leave open the third leg 12c, i.e., open the leg through which the DC current $i_a$ does not flow, provide the PWM signal PC' to the high side switch of the first leg 12a, e.g., the input leg, and close the low side switch of second leg 12b, e.g., the return leg, through which the DC current $i_a$ circulates to ground.

The motor current $I_a$ is taken on the phase a and brought as feedback motor current $I_{a,fdbk}$ to the motor control logic 20, in which only the second control loop operates. The difference block 24 further receives a reference motor current $I_{a,ref}$ value and the proportional integral module 25 feeds the duty cycle value D commanding the phase voltage $v_a = D^* V_{dc}$ applied to the first leg 12a, D being comprised between 0 and 1.

Figure 5:
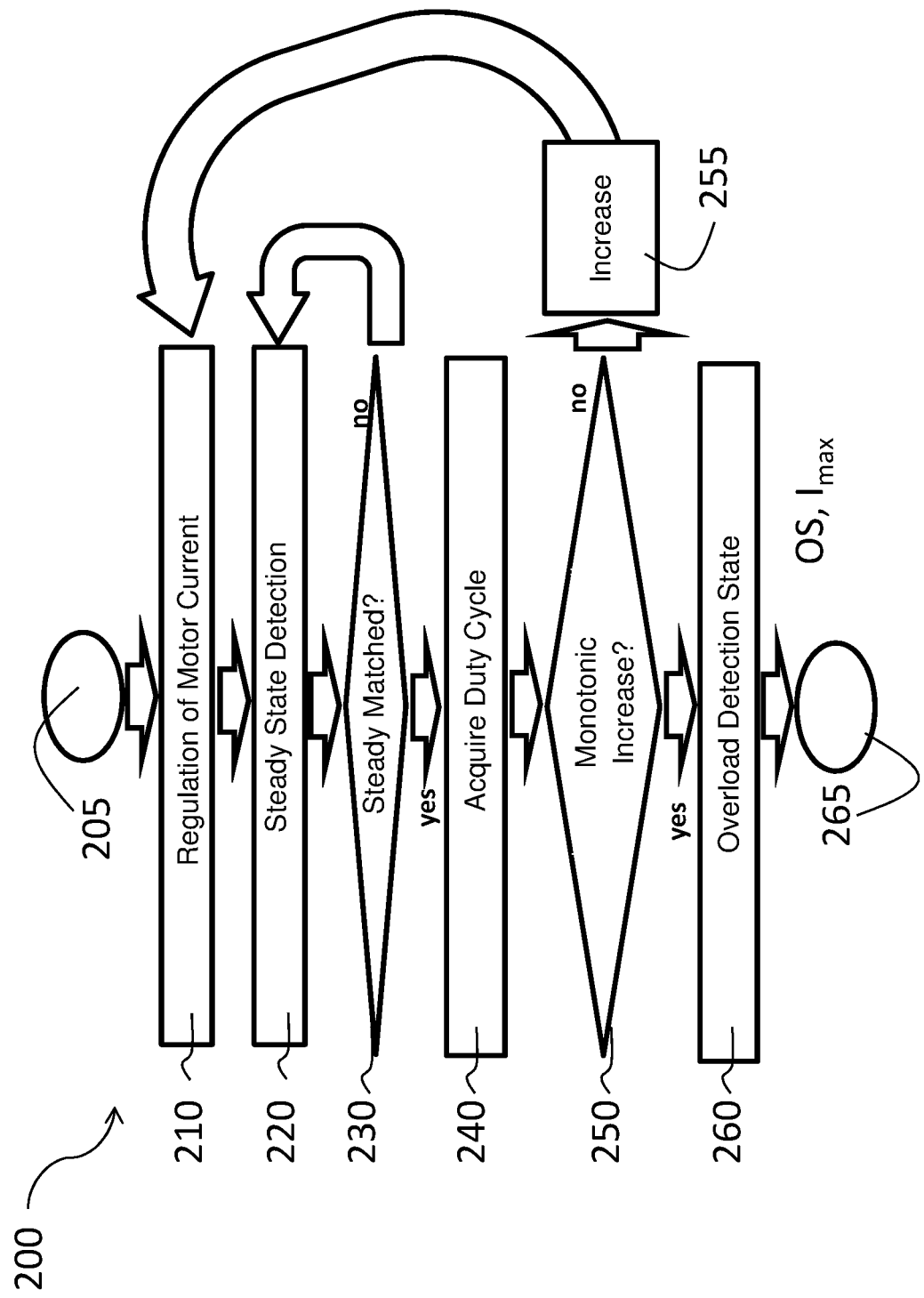
FIG. 5 is a flow diagram of operations of a further embodiment of the solution here described.

FIG. 5 is a flow diagram illustrating an alternative embodiment 200 of the method of controlling the motor with a detection of an overload. This method is performed offline and includes operations for making a maximum current detection, which may be implemented by the system 10 in the configuration of the system shown in FIG. 4.

After a start 205 of the operations, the method 200 provides in step 210 an operation for performing a regulation of the motor current $I_a$ as shown in FIG. 4, using the configuration of FIG. 4 of the system 10 and of the control 20, while the motor is in a standstill state, since the DC current, as shown in FIG. 4 is flowing in two windings and the motor cannot rotate.

Then, in step 220 an operation for detecting a steady state condition of the motor is performed, for instance by the module 31 of FIG. 2. Preferably, in order to detect the steady state condition the phase current is monitored. The phase current is a quantity whose measure is generally available in multiphase motors, and in any case can be measured.

Then, a test 230 is performed to check whether a steady condition is matched.

If NO, the operations of steps 220, 230 are repeated. If YES, an operation 240 is performed to acquire the duty cycle D value of the sole phase voltage $v_a$.

In a following test 250, it is determined whether the duty cycle D is found to be monotonically increasing and the forced DC current, i.e. the sole motor current $i_a$, is still constant.

If NO, control returns to the step 210 where the phase current amplitude is increased in step 255 by a fixed amount, i.e., the reference current $I_{a,ref}$ is increased of a fixed amount.

If YES, i.e., the duty cycle D is found to monotonically increase and the forced DC current $i_a$ is still constant, then a subsequent operation 260 is performed to enter into an overload detection state, for instance issuing the overload state signal OS, and acquiring as maximum current $I_{max}$ the last value taken by the DC current $i_a$ before the verification of condition 250. The process then ends in step 265.

The solutions disclosed herein have thus significant advantages with respect to the known solutions.

The solution described allows for detecting the motor overload condition during normal operation at constant load and speed.

The solution described allows for detecting the maximum motor phase current which can flow continuously in the stator winding, this allows for a characterization of the motor considering the aging of the motor to be performed.

The solution described allows in general for optimization of the control technique for maintaining the rated efficiency according to variation in the motor parameters, thus preventing serious motor damage, permitting detection of an excessive derating of the motor and enabling planning for a motor replacement, according to the motor application.

More specifically, the solution described allows for reducing costs since thermal sensing is not required and the current and voltage sensors (motor three phases or DC link voltage) required for motor control are used.

All required computations and measurement are performed using the same MCU used for motor control.

Of course, without prejudice to the principle of the invention, the details of construction and the embodiments may vary widely with respect to what has been described and illustrated herein purely by way of example, without thereby departing from the scope of the present invention, as defined by the ensuing claims.

The claims are an integral part of the technical teaching of the disclosure provided herein.

The invention claimed is:

1. A method of controlling a multi-phase electric motor having a stator winding, comprising:
   regulating a current flowing in the multi-phase electric motor by controlling a multi-phase voltage applied to the multi-phase electric motor through a switch mode inverter driven by a control modulated signal; and
   detecting an overload condition of said multi-phase electric motor, by:
      controlling the multi-phase electric motor in a steady state condition in which the current flowing in said multi-phase electric motor has constant phase with the multi-phase electric motor operating at constant load and with a constant speed; and
      monitoring a modulation index of the multi-phase voltage applied to the multi-phase electric motor while in the steady state condition to detect a thermal increase of a value of a stator resistance of the stator winding of the multi-phase electric motor, wherein monitoring the modulation index comprises detecting a monotonic increase of the modulation index that occurs while the multi-phase electric motor is in the steady state condition; and
      generating an overload detection signal if the monotonic increase is detected.

2. The method according to claim 1, further including detecting the steady state condition of the multi-phase electric motor as a function of the speed and torque of the motor.

3. The method according to claim 1, further including, after detecting, measuring the stator resistance value.

4. The method according to claim 1, wherein detecting the monotonic increase comprises monitoring a duty cycle of the multi-phase voltage applied to the multi-phase electric motor.

5. The method according to claim 1, wherein detecting the monotonic increase comprises estimating a resistance with a self-commissioning algorithm.

6. The method according to claim 1, wherein detecting the monotonic increase comprises computing or estimating a motor power using the multi-phase voltage and current.

7. A computer program product directly loadable into the internal memory of a digital computer, comprising software code portions which are executable by the digital computer to perform the steps of the method of claim 1.

8. A The method of controlling a multi-phase electric motor having a stator winding comprising:
   a) regulating a DC current flowing in the multi-phase electric motor by controlling a multi-phase voltage applied to the multi-phase electric motor through a switch mode inverter driven by a control modulated signal to place the motor in a standstill condition;
   b) detecting a steady state condition of the multi-phase electric motor;
   c) monitoring a duty cycle of a voltage applied to a high side of a first leg of the switch mode inverter, while maintaining open high side and low side switches of other legs with the exception of one of the low side switches of said other legs, which is maintained closed in order to detect a thermal increase of a value of a stator resistance of the stator winding of the multi-phase electric motor; and
   d) verifying that there is a monotonic increase of the duty cycle while the multi-phase electric motor is in the steady state condition, and if verified then entering into an overload state by generating an overload detection signal.

9. The method according to claim 8, further comprising:
   if the multi-phase electric motor is not detected in step b) to be in a steady state condition, then increasing the regulated DC current in step a) by a fixed amount; and
   acquiring as a maximum current a last value of the regulated DC current before the verification of the condition in step d) is obtained.

10. A computer program product directly loadable into the internal memory of a digital computer, comprising software code portions which are executable by the digital computer to perform the steps of the method of claim 8.

11. A device for driving a multi-phase electric motor having a stator winding, comprising:
   a first circuit configured to detect an overload condition of said multi-phase electric motor; and
   a second circuit configured to regulate a current flowing in the multi-phase electric motor by controlling a multi-phase voltage applied to the multi-phase electric motor through a switch mode inverter driven by a control modulated signal, the second circuit further configured to control the multi-phase electric motor in a steady state condition in which the current flowing in said multi-phase electric motor has constant phase with the multi-phase electric motor operating at constant load and with a constant speed;
   wherein said first circuit comprises:
      a monitoring circuit configured to monitor a modulation index of the multi-phase voltage applied to the multi-phase electric motor while in the steady state condition to detect a thermal increase of a value of a stator resistance of the stator winding of the multi-phase electric motor, and further configured to generate an overload detection signal in response to verification of a monotonic increase of the modulation index while the multi-phase electric motor is operating in the steady state condition.

12. The device according to claim 11, wherein said first circuit further comprises:
   a steady state detection circuit configured to detect during operation of the multi-phase electric motor the steady state condition of the multi-phase electric motor as a function of the torque and speed of said multi-phase electric motor; and
   wherein the monitoring circuit is further configured to enter into an overload detection state if the monotonic increase is verified.

13. The device according to claim 12, wherein the monitoring circuit further measures a stator resistance value if entered in the overload detection state.

14. An electric motor system, comprising a multi-phase electric motor coupled with a device for driving according to claim 11.

15. A device for driving a multi-phase electric motor having a stator winding, comprising:
   an operation circuit configured to: a) regulate a DC current in the multi-phase electric motor while in a standstill condition;
   a steady state detection module configured to: b) detect during operation of the multi-phase electric motor a steady state condition of the multi-phase electric motor; and
   a circuit configured to detect an overload condition of said multi-phase electric motor by:
      c) monitoring a duty cycle of a voltage applied to a high side of a first leg of a switch mode inverter, while maintaining open high side and low side switches of other legs with the exception of one of the low side switches of said other legs, which is maintained closed in order to detect a thermal increase of a value of a stator resistance of the stator winding of the multi-phase electric motor; and
      d) verifying that there is a monotonic increase of the duty cycle while the multi-phase electric motor is in the steady state condition, and in response to verification enter into an overload state and generate an overload detection signal.

16. The device according to claim 15, wherein if the multi-phase electric motor is not detected to be in the steady condition, then the operation circuit is further configured to apply an increase in the regulated DC current by a fixed amount, and wherein the circuit is further configured, when the multi-phase electric motor is in the steady state condition, to acquire as a maximum current a last value of current before verifying the monotonic increase.

17. An electric motor system, comprising a multi-phase electric motor coupled with a device for driving according to claim 15.

* * * * *